US008139112B2

(12) United States Patent
Cleary et al.

(10) Patent No.: US 8,139,112 B2
(45) Date of Patent: Mar. 20, 2012

(54) METHODS AND APPARATUS RELATED TO IMPROVED SURVEILLANCE

(75) Inventors: Geoffrey Alan Cleary, Ambler, PA (US); Danny Chin, Princeton Junction, NJ (US)

(73) Assignee: Sightlogix, Inc., Princeton, NJ (US)

( * ) Notice: Subject to any disclaimer, the term of this patent is extended or adjusted under 35 U.S.C. 154(b) by 805 days.

(21) Appl. No.: 11/500,100

(22) Filed: Aug. 7, 2006

(65) Prior Publication Data

US 2008/0030577 A1 Feb. 7, 2008

(51) Int. Cl.
*H04N 7/18* (2006.01)

(52) U.S. Cl. ........ 348/143; 348/153; 348/154; 348/155; 348/159; 348/441; 348/207.99

(58) Field of Classification Search .................. 348/159, 348/13–155, 441, 207.99
See application file for complete search history.

(56) References Cited

U.S. PATENT DOCUMENTS 4,999,614 A * 3/1991 Ueda et al. .................... 340/588
6,061,055 A * 5/2000 Marks ........................... 382/276
6,069,655 A * 5/2000 Seeley et al. .................. 348/154
6,244,710 B1 * 6/2001 Ogawa .......................... 351/206
6,633,657 B1 * 10/2003 Kump et al. .................. 382/128
6,973,218 B2 * 12/2005 Alderson et al. .............. 382/260
7,542,588 B2 * 6/2009 Ekin et al. ..................... 382/103
2004/0143380 A1 * 7/2004 Stam et al. ...................... 701/36
2006/0098729 A1 * 5/2006 Shen ........................ 375/240.01

* cited by examiner

*Primary Examiner* — David Ometz
*Assistant Examiner* — Antoinette Spinks
(74) *Attorney, Agent, or Firm* — Straub & Pokotylo; Michael P. Straub; Stephen T. Straub

(57) ABSTRACT

A smart camera device incorporates a first processing path for video display processing and a second processing path for detection and/or tracking processing. A sensor device provides input signals including first size data units to both processing paths, at least some of the same input signals are processed by both processing paths. The video display processing generates second size data units which are smaller than first size data units. First size data units provide more information to the detection/processing module than second size data units would have provided if used. IR detection capability is improved by using first size data units. Detection and/or target tracking operations generate control signals used to control the video display processing to enhance the visual perceptibility of a detected target. Detection and/or target tracking operations generate target information signals conveying an indication of target detection, target identification information, target location information, and/or camera control signal.

30 Claims, 5 Drawing Sheets

METHODS AND APPARATUS RELATED TO IMPROVED SURVEILLANCE

FIELD OF INVENTION

The present invention relates generally to apparatus and methods for surveillance, and more particularly to apparatus and methods for surveillance incorporating different processing paths for video display processing and detection/tracking processing.

BACKGROUND

FIG. 1 is a drawing of a prior art video monitoring and detection system 100. System 100 includes a traditional video camera 102, coupled to a display 104 and an analog-to-digital (A/D) converter 106. The A/D converter 106 is also coupled to a detection processing node 108. The traditional video camera 102 includes a front end stage 110 coupled to a visualization based dynamic range compression module 120, which is coupled to an 8 bit digital-to-analog (D/A) converter 124. The D/A 124 is coupled to an analog output interface 128 which outputs an analog video feed signal.

The front end stage 110 includes a lens 112, a sensor 114, and a 16 bit digital output interface 116. Light corresponding to an image is received via lens 112 and detected by sensor 114, e.g., obtaining a plurality of pixel values each pixel value being represented by 16 bits. Digital output interface 116 outputs signal 118 conveying 16 bit/unit pixel values to the visualization based dynamic range compression module 120. Module 120 performs compression operations on the received 16 bit pixel values and outputs signal 122 carrying 8 bit pixel values to the input of the 8 bit D/A converter 124. The D/A converter 124 converts received digital signals to an analog signal 126 which is input to the analog output interface 128. Analog output interface 128 outputs an analog video feed signal 130 which is input to both the display 104 and an 8 bit A/D converter 106.

Display 104, e.g., a traditional monitor with analog input, displays a video image represented by the analog feed signal 130. The A/D converter 106 converts the analog video feed signal 130 to 8 bit digital representations, which are input via signal 107 to detection processing node 108. Detection processing node 108 evaluates a plurality of 8 bit representation digital signals to perform detection operations, e.g., detecting an intruder. It should be noted that the detection processing node 108 is receiving as input 8 bit representations corresponding to pixel values and that the received 8 bit representations are derived from signals that have been subjected to visualization based dynamic range compression. The visualization based dynamic range compression is advantageous from the perspective of a human viewer watching display 104; however, such visualization based compression is detrimental to the detection processing node 108 which doesn't benefit from human visualization based image data adjustments. The detection processing node 108 operates using lower resolution data than the data output from the digital output interface 116 of the front end stage 110. In addition, signals 107, which are input the detection processing node 108 have been subjected to a D/A 124 stage and A/D 106 stage, both which degrade signal quality.

In view of the above description, there is a need for improved methods and apparatus related to video monitoring and detection. It would be beneficial if some methods and apparatus separated at least some human visualization directed processing from at least some detection/tracking directed processing. Methods and apparatus that direct at least some sensor output signals conveying the same size data units to both an input of a visual processing path and an input of a detection/tracking processing path would also be beneficial. Methods and apparatus that utilize sensor output signals, which have not been subjected to visualization based compression, for detection and tracking operations would also be advantageous.

SUMMARY

A smart camera device, in accordance with various embodiments of the present invention, incorporates a first processing path for video display processing and a second processing path for detection and/or tracking processing. A sensor module, e.g., a visible light and/or infrared sensor device, provides input signals including first size data units to both processing paths, at least some of the same input signals are processed by both processing paths. The video display processing, e.g., a non-uniform compression directed to human visual perception characteristics, generates second size data units which are smaller than first size data units. First size data units provide more information to the detection/processing module than second size data units would have provided had the second size data units been used. Target detection capability, identification, and/or tracking is improved by using first size data units rather than using second size data units. In some embodiments, target discrimination utilizing infrared measurements is facilitated by using the first size data units, wherein such IR based target discrimination would not have been otherwise practically feasible had said second size data units been used instead.

Detection and/or target tracking operations generate control signals used to control the video display processing to enhance the visual perceptibility of a detected target. For example, control signals from a detection and/or tracking path processing module are directed to a video display path processing module to control adjustments of the visual processing, e.g., controlling adjustments of visual equalization. Detection and/or target tracking operations also generate target information signals conveying an indication of target detection, target identification information, target location information, and/or camera control signal.

An exemplary integrated camera assembly in accordance with various embodiments of the present invention includes: a camera housing; a sensor module for generating first fixed size image data units; an image processing module located in said camera housing for performing an image processing operation on at least some of said first fixed size data units to produce second size data units, said second size data units being of a second fixed size which is smaller than said first fixed size; a video compression module coupled to said image processing module for generating a compressed image output signal from said second size data units; and a secondary processing module, included in said camera housing, for processing at least some of said first fixed size data units, which are also processed by said image processing module, said secondary processing module for performing at least one of a target detection and a target tracking operation.

An exemplary method of operating an integrated camera assembly includes: operating a sensor module to generate first fixed size image data units; performing an image processing operation on at least some of said first fixed size data units to produce second size data units, said second size data units being of a second fixed size which is smaller than said first fixed size; generating an image output signal from said second size data units; and processing at least some of said first fixed size data units, which are also processed by said image processing operation, to perform at least one of a target detection and a target tracking operation.

While various embodiments have been discussed in the summary above, it should be appreciated that not necessarily all embodiments include the same features and some of the features described above are not necessary but can be desirable in some embodiments. Numerous additional features, embodiments and benefits of the various embodiments are discussed in the detailed description which follows.

DETAILED DESCRIPTION

Figure 1:
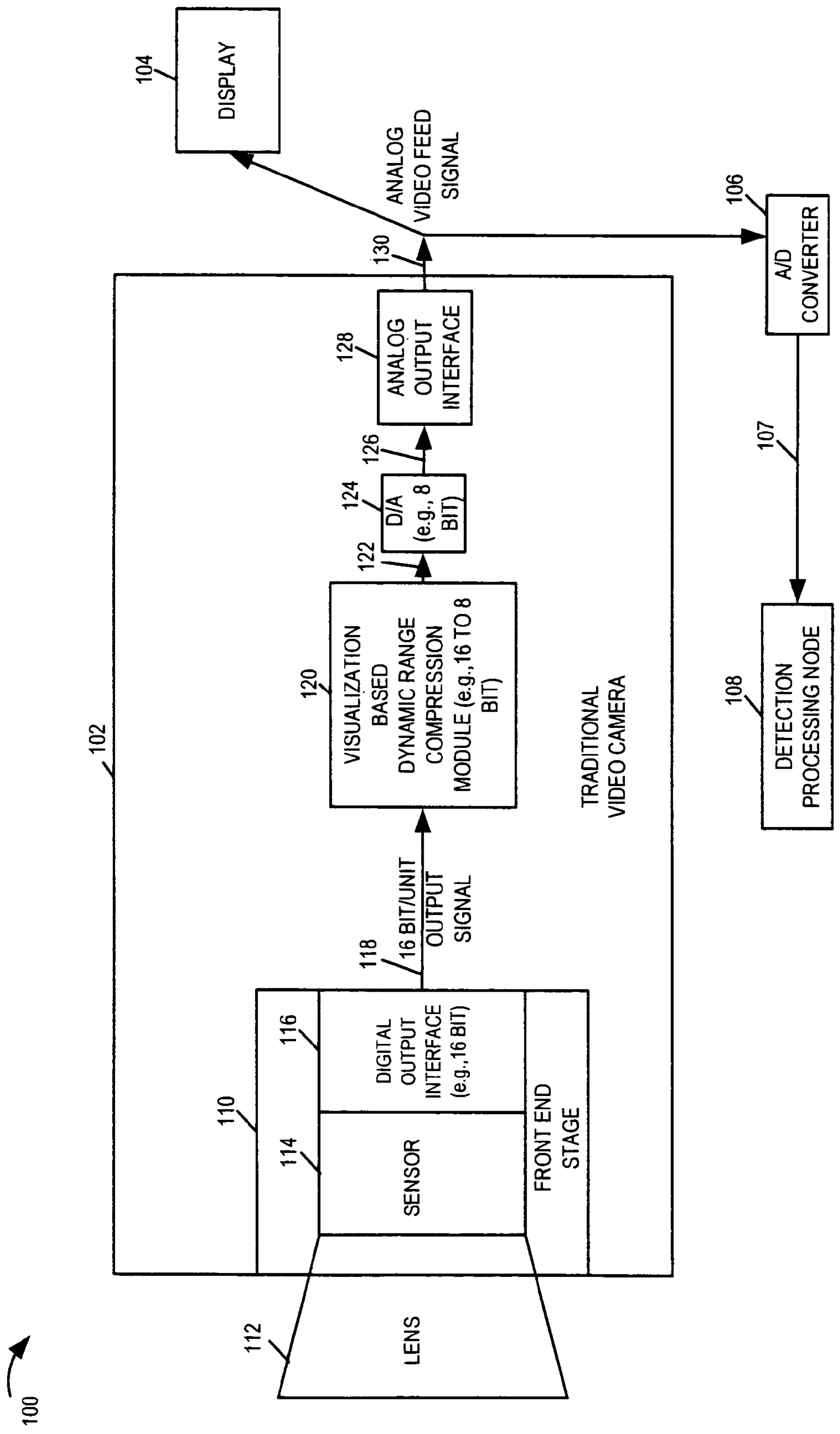
PRIOR ART FIGURE 1
FIG. 1 is a drawing of a prior art video monitoring and detection system.
Figure 2:
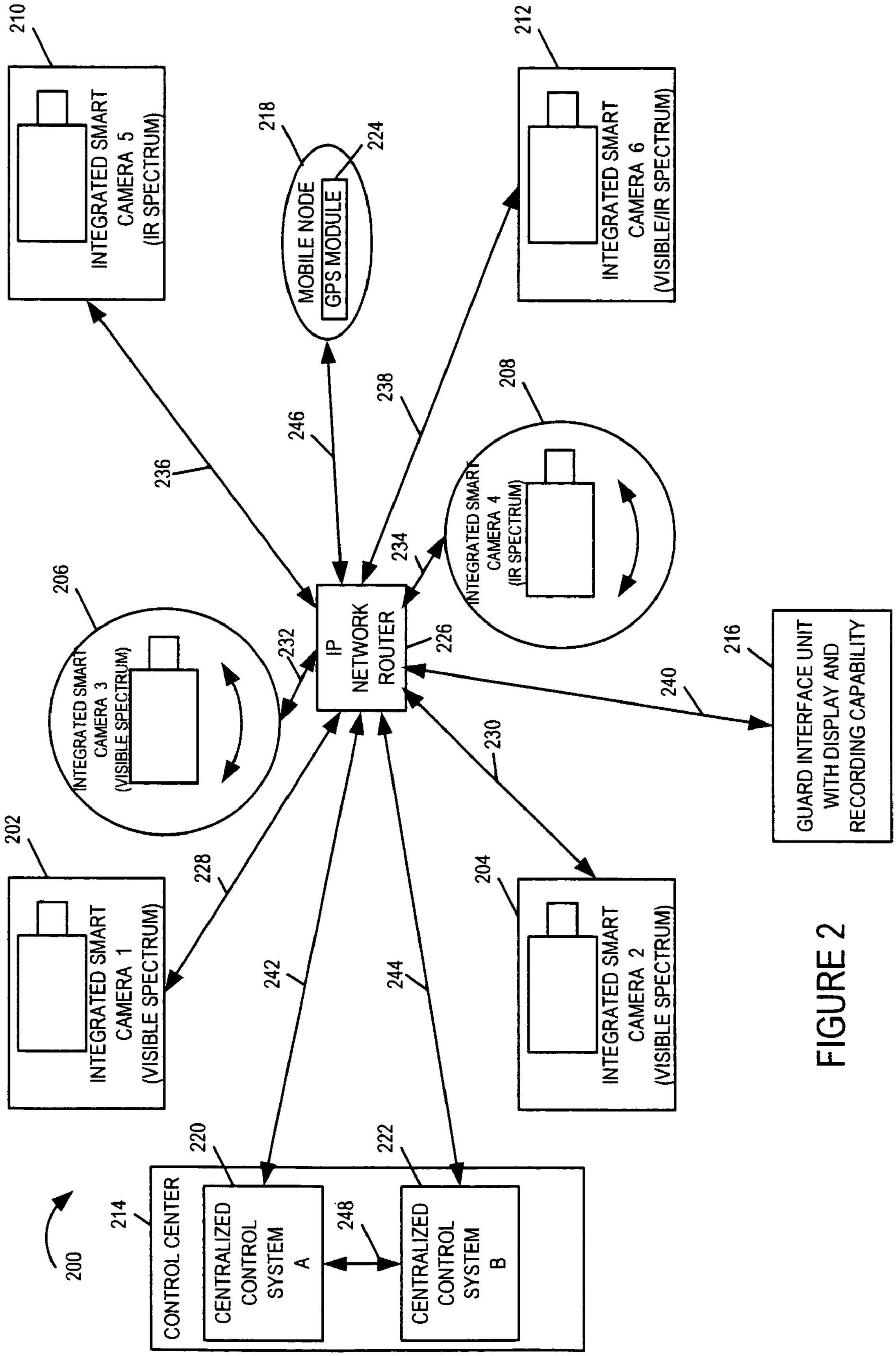
FIG. 2 is a drawing of an exemplary threat detection and target tracking surveillance system implemented in accordance with the present invention and using methods of the present invention.

FIG. 2 is a drawing of an exemplary threat detection and target tracking surveillance system 200 implemented in accordance with the present invention and using methods of the present invention. Exemplary surveillance system 200 includes a plurality of integrated smart cameras (integrated smart camera 1 202, integrated smart camera 2 204, integrated smart camera 3 206, integrated smart camera 4 208, integrated smart camera 5 210, integrated smart camera 6 212), a control center 214 including a centralized control system A 220 and a centralized control system B 222, a guard interface unit 216, a mobile node 218, and an IP network router 226. The various elements (202, 204, 206, 208, 210, 212, 220, 222, 216, 218) are coupled to the IP network node 226 via links (228, 230, 232, 234, 236, 238, 242, 244, 240, 246), respectively, over which the various elements may interchange data and information. The links (228, 230, 232, 234, 236, 238, 242, 244, 240, 246) are wired, fiber optic and/or wireless links.

Integrated smart camera 1 202 and integrated smart camera 2 204 are visible spectrum fixed mount cameras, which may include lens focal point adjustment, e.g., zoom, capability. Integrated smart camera 3 206 is a visible spectrum camera controllably adjustable in terms of rotary position, tilt position and elevation, and may include zoom capability. Integrated smart camera 4 208 is an infrared (IR) spectrum camera controllably adjustable in terms of rotary position, tilt position and elevation, and may include zoom capability. Integrated smart camera 5 210 is an IR spectrum fixed mount camera 210 which may include a zoom capability. Integrated smart camera 6 212 is a hybrid visible spectrum/IR fixed mount camera and may include zoom capability.

The control center 214, by including two control systems, centralized control center A 220 coupled via link 248 to centralized control center B 222, supports a division of tasks, fault detection, and dynamic reconfiguration in response to detected errors. Guard interface unit 216 includes a display, recording capability, and alarm signaling devices. In some embodiments, the guard interface unit 216 is included as part of the control center 214 or is co-located at the same site as the control center 214. Mobile node 218, e.g., a wireless communications device carried by a guard on patrol or investigating a detected potential threat or imbedded in a security vehicle, includes a GPS module 218 for determining the accurate position of MN 218 and directing the guard to a detected target for further investigation.

Figure 3:
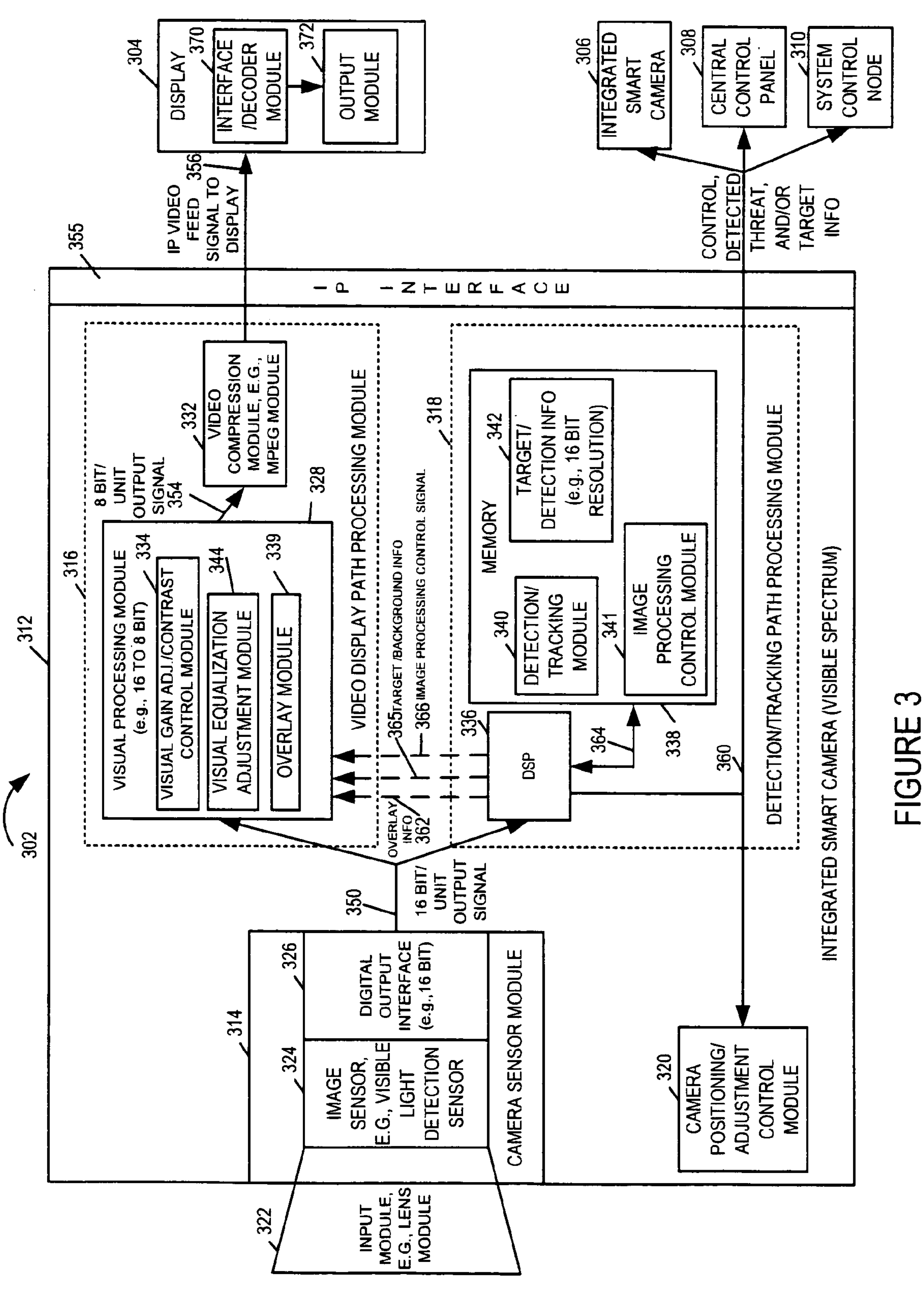
FIG. 3 is a drawing of an exemplary integrated visible spectrum smart camera, implemented in accordance with the present invention, coupled to a display, another integrated smart camera, a central control panel and a system control node.

FIG. 3 is a drawing of an exemplary integrated visible spectrum smart camera 302 coupled to a display 304, another integrated smart camera 306, a central control panel 308 and a system control node 310. For example, exemplary integrated smart camera 302 may be one of visible spectrum cameras (202, 204, 206), integrated smart camera 306 may be one of integrated smart cameras (202, 204, 206, 208, 210, 212), the display 304 and central control panel 308 may be included as part of the guard interface unit 216, and system control node 310 may be control center 214.

Exemplary smart camera 302 includes a camera housing 312, a camera sensor module 314, a video display path processing module 316, a detection/tracking path processing module 318, a camera positioning/adjustment control module 320 and an Internet Protocol (IP) interface 355. Camera sensor module 314 includes an input module 322, e.g., a lens module, an image sensor 324, e.g., a visible light sensor detector such as a charge coupled device, and a digital output interface 326 which communicates 16 bit/unit digital information signals 350, e.g., pixel value representations using 16 information bits to convey the representation.

Video display path processing module 316 includes a visual processing module 328, and a video compression module 332. In some embodiments, the visual processing module 328 is a non-uniform image compression module. In some such embodiments, an image processing control signal 366 controls the non-uniform image compression module to enhance the visual perceptibility of a detected target. Visual processing module 328 includes a visual gain adjustment/contrast control module 334, a visual equalization adjustment module 344, and an overlay module 339. Visual processing module 328 receives a 16 bit/unit output signal 350 from the digital output interface 326 of the camera sensor module 314. In addition, video processing module 328 may, and sometimes does, receive one or more of overlay information signals 362, target/background information signals 365 and image processing control signals 366 from detection/tracking path processing module 318. Visual processing module 316 performs various video processing operations resulting in output 8 bit/unit output signal 354 which is input to the video compression module 332. The video compression module 332 is, e.g., a MPEG module. Video compression module 332 outputs, via IP interface 355, an IP video feed signal 356 to display 304.

The display 304 includes an interface/decoder module 370 and an output module 372. Interface/decoder module 370 receives the compressed IP video feed signal 356, performs decoding operations and generates a decoded signal which it feeds to output module 372 for a display which can be viewed by a human, e.g., guard.

Detection/tracking path processing module 318 includes a digital signal processor 336 and memory 338 coupled together via a bus 364 over which the processor 336 and memory 338 interchange data/and information. Memory 338 includes a detection/tracking module 340, target/detection information 342, and an image processing control module 341. DSP 336 executes the modules and uses the data/information in memory 338 to control the operation of the detection/tracking path processing module 318 and implement methods of the present invention. The DSP 336 receives as input 16 bit/unit output signals 350, e.g., 16 bit/unit pixel value representations, from the digital output interface 326 of the camera sensor module 314. The DSP 336 outputs information 360 which includes control information, detected threat information, and/or target information. Information 360 includes information used internally by camera 302, e.g., information directed to camera positioning/adjustment control module 320. Information 360 also includes information directed, via IP interface 355, to external devices, e.g., integrated smart camera 306, central control panel 308, and system control node 310. The DSP 336 also outputs signals directed to the visual processing module 328 of the video display path processing module 316, e.g., to advantageously adjust the visual processing of module 328 in view of detected threat and/or tracking information. Signals directed to visual path processing module 328 from detection/tracking path processing module 318 include overlay information 362, target/background information 365, and image processing control signals 366.

Signals 362, 365 and/or 360 communicate at least one of: an indication that a target has been detected, information identifying the target, information characterizing an identified target, a camera positioning control signal, a second camera positioning control signal used to control a second camera, and location information relating to tracking a target.

The detection/tracking module 340 detects threats, e.g., intruders, in an area of surveillance, and performs tracking operations, e.g., such that the camera is controlled to be focused in on and/or follow the intruder as the intruder moves in a surveillance coverage area. Detection/tracking module 340 generates various control, detected threat, and/or target information signals 360, overlay information signals 362, and target/background information signals 365. Image processing control module 341 generates image processing control signals 366. Target/detection information 342 includes information using 16 bit/unit resolution. Detection/tracking path processing module 318 by using the higher bit/unit resolution (16 bit/unit resolution) for its input signals and internal processing operations potentially can achieve improved detection and tracking capabilities over an embodiment which uses a 8 bit/unit resolution input. Detection/tracking path processing module 360, by using a parallel input from digital output interface 326, is not negatively impacted by particular visual processing operations which are well suited for a human's visual perception, but are disadvantageous to detection and/or tracking computer based operations.

Overlay information 362 includes, e.g., information to be used by overlay module 339 to put a box around a target or superimpose a symbol on a target. Target/background information 365 includes, e.g., information conveying a determined position associated with a target, information identifying a target or type of target, e.g., from a group of potential targets or types of targets, information associating an index value or identifier with a target, information associating a direction of movement with a target and/or information associating a velocity with a target. In some embodiments, information representative of target/background information 365 is added to the visual surveillance image, e.g., text, symbols, etc. Image processing control information signals 366 includes, e.g., control signals used by the visualization equalization adjustment module 344 and/or the visual gain adjustment/contrast control module 334.

Figure 4:
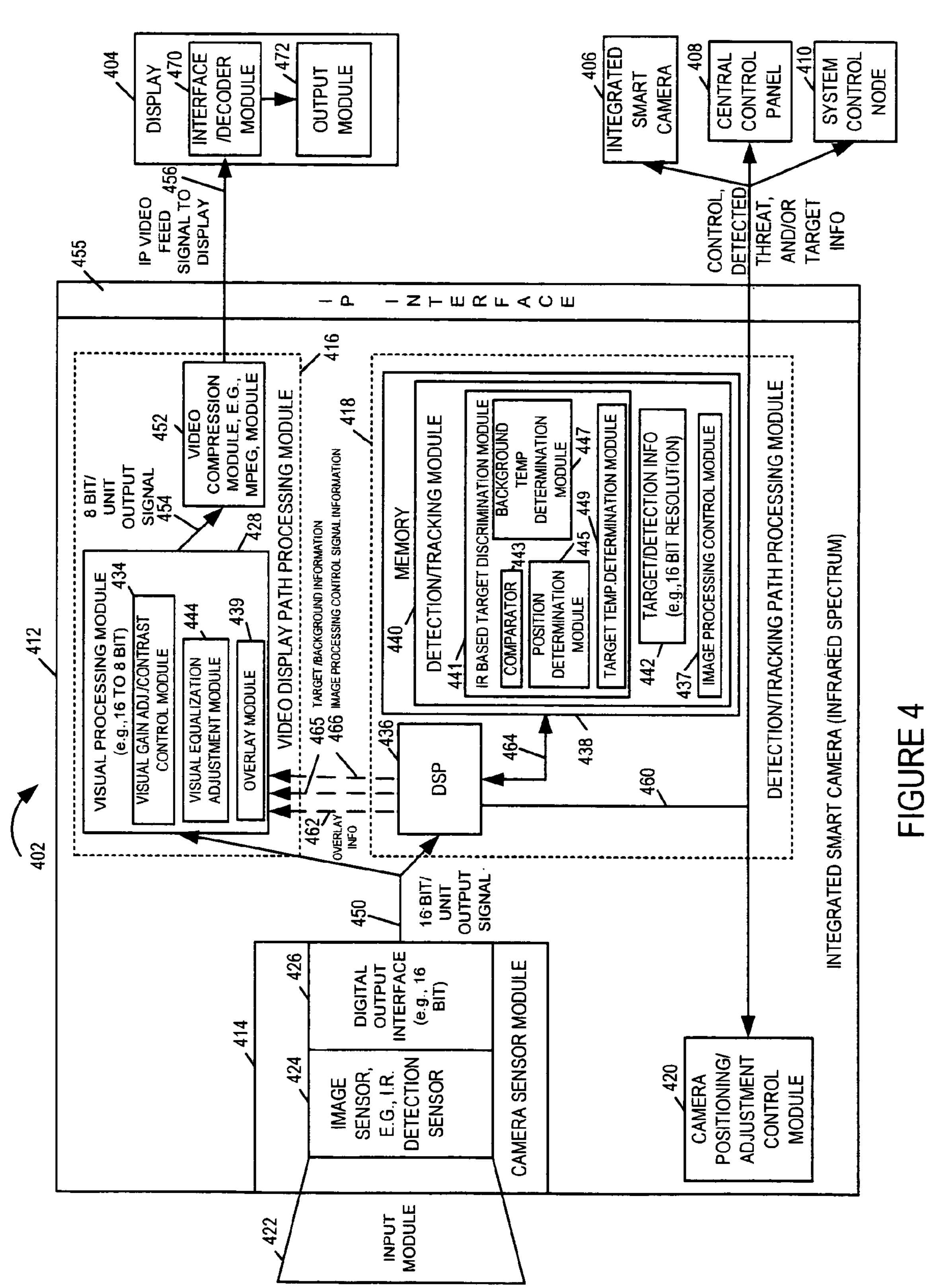
FIG. 4 is a drawing of an exemplary integrated infrared spectrum smart camera, implemented in accordance with the present invention, coupled to a display, another integrated smart camera, a central control panel and a system control node.

FIG. 4 is a drawing of an exemplary integrated infrared spectrum smart camera 402 coupled to a display 404, another integrated smart camera 406, a central control panel 408 and a system control node 410. For example, exemplary integrated smart camera 402 may be one of IR spectrum cameras (208, 210), integrated smart camera 406 may be one of integrated smart cameras (202, 204, 206, 208, 210, 212), the display 404 and central control panel 408 may be included as part of the guard interface unit 216, and system control node 410 may be control center 214.

Exemplary smart camera 402 includes a camera housing 412, a camera sensor module 414, a video display path processing module 416, a detection/tracking path processing module 418, a camera positioning/adjustment control module 420, and an IP interface 455. Camera sensor module 414 includes an input module 422, an image sensor 424, e.g., an infrared electromagnetic radiation detection sensor 424, and a digital output interface 426 which communicates 16 bit/unit digital information signals 450, e.g., pixel value representations using 16 information bits to convey the representation.

Video display path processing module 416 includes a visual processing module 428 and a video compression module 452. In some embodiments, the visual processing module 428 is a non-uniform image compression module. In some such embodiments, an image processing control signal 466 controls the non-uniform image compression module to enhance the visual perceptibility of a detected target. Video processing module 428 includes a visual gain adjustment/contrast control module 434, a visual equalization adjustment module 444, and an overlay module 439. Visual processing module 428 receives a 16 bit/unit output signal 450 from the digital output interface 426 of the camera sensor module 414. In addition, video processing module 428 may, and sometimes does, receive one or more of overlay information signals 462, target/background information signals 465 and image processing control signal 466 from detection/tracking path processing module 418. Visual processing module 416 performs various video processing operations resulting in output 8 bit/unit output signal 454 which is input to the video compression module 452. The video compression module 452, e.g., an MPEG module, compresses the signal 454 to generate an IP video feed signal 456, which is output via IP interface 455 to display 404.

The display 404 includes an interface/decoder module 470 and an output module 472. Interface/decoder module 470 receives the compressed IP video feed signal 456, performs decoding operations and generates a decoded signal which it feeds to output module 472 for a display which can be viewed by a human, e.g., guard.

Detection/tracking path processing module 418 includes a digital signal processor 436 and memory 438 coupled together via a bus 464 over which the processor 436 and memory 438 interchange data/and information. Memory 438 includes a detection/tracking module 440, an image processing control module 437 and target/detection information 442. Detection/tracking module 440 includes an IR based target discrimination module 441. IR based target discrimination module 441 includes a comparator 443, a position determination module 445, a background temperature determination module 447, and a target temperature determination module 449. DSP 436 executes the modules and uses the data/information in memory 440 to control the operation of the detection/tracking path processing module 418 and implement methods of the present invention. The DSP 436 receives as input 16 bit/unit output signals 450, e.g., 16 bit/unit pixel value representations, from the digital output interface 426 of the camera sensor module 414. The DSP 436 outputs information 460 which includes control information, detected threat information, and/or target information. Information 460 includes information used internally by camera 402, e.g., information directed to camera positioning/adjustment control module 420. Information 460 also includes information directed, via IP interface 455, to external devices, e.g., integrated smart camera 406, central control panel 408, and system control node 410. The DSP 436 also outputs signals directed to the visual processing module 428 of the video display path processing module 416, e.g., to advantageously adjust the visual processing of module 428 in view of detected threat and/or tracking information. Signals directed to visual path processing module 428 from detection/tracking path processing module 418 include overlay information 462, target/background information 465, and image processing control signals 466.

Signals 462, 465 and/or 460 communicate at least one of: an indication that a target has been detected, information identifying the target, information characterizing an identified target, a camera positioning control signal, a second camera positioning control signal used to control a second camera, and location information relating to tracking a target.

The detection/tracking module 440 detects threats, e.g., intruders, in an area of surveillance, and performs tracking operations, e.g., such that the camera can be controlled to be focused in on and/or follow the intruder as the intruder moves in a coverage area. Detection/tracking module 440 generates various control, detected threat and/or target information signals 460, overlay information signals 462, and target/background information signals 465. Image processing control module 437 generates image processing control signals 466. Target/detection information 442 includes information using 16 bit/unit resolution. Detection/tracking path processing module 418 by using the higher bit/unit resolution (16 bit/unit resolution) for its input signals and internal processing operations potentially can achieve improved detection and tracking capabilities over an embodiment which uses a 8 bit/unit resolution input. Detection/tracking path processing module 418, by using a parallel input from digital output interface 426, is not negatively impacted by particular visual processing operations which are well suited for a human's visual perception, but are disadvantageous to detection and/or tracking computer based operations.

IR based target discrimination module 441 performs various operations related to target discrimination, identification, and/or tracking using infrared related information. Discrimination module 441 discriminates between targets and non-target objects based on detected infrared signals. The discrimination of module 441 is based on first sized data units, e.g., 16 bit data units, which provide more information than second size data units, e.g., 8 bit size data units. In some embodiments, IR target discrimination is possible in accordance with the present invention by utilizing the first size data units as input, while IR target discrimination would not have been possible had the second size data units have been used as input. Background temperature determination module 447 determines background temperature values in a surveillance area. Target temperature determination module 449 determines the temperature of potential targets, identified targets, and targets being tracked. Comparator module 443 compares potential target temperatures to stored information associated with targets, e.g., a threshold corresponding to an expected target temperature, and/or to background temperature measurements. Position determination module 445 determines target related position, e.g., the position of a potential target, the position of an identified target, and/or the position of a target being tracked. Position determination module 445 determines if a possible target changes position with time.

Overlay information 462 includes, e.g., information to be used by overlay module 439 to put a box around a target. Target/background information 465 includes, e.g., information conveying a determined temperature associated with the background, information conveying a determined temperature associated with a target, information conveying a determined position associated with a target, information identifying a target or type of target, e.g., from a group of potential targets or types of targets, information associating an index value or identifier with a target, information associating a direction of movement with a target and/or information associating a velocity with a target. In some embodiments, information representative of target/background information 465 is added to the visual surveillance image, e.g., text, symbols, etc. Image processing control information signals 466 include, e.g., control signals used by the visualization equalization adjustment module 444 and/or the visual gain adjustment/contrast control module 434.

Figure 5:
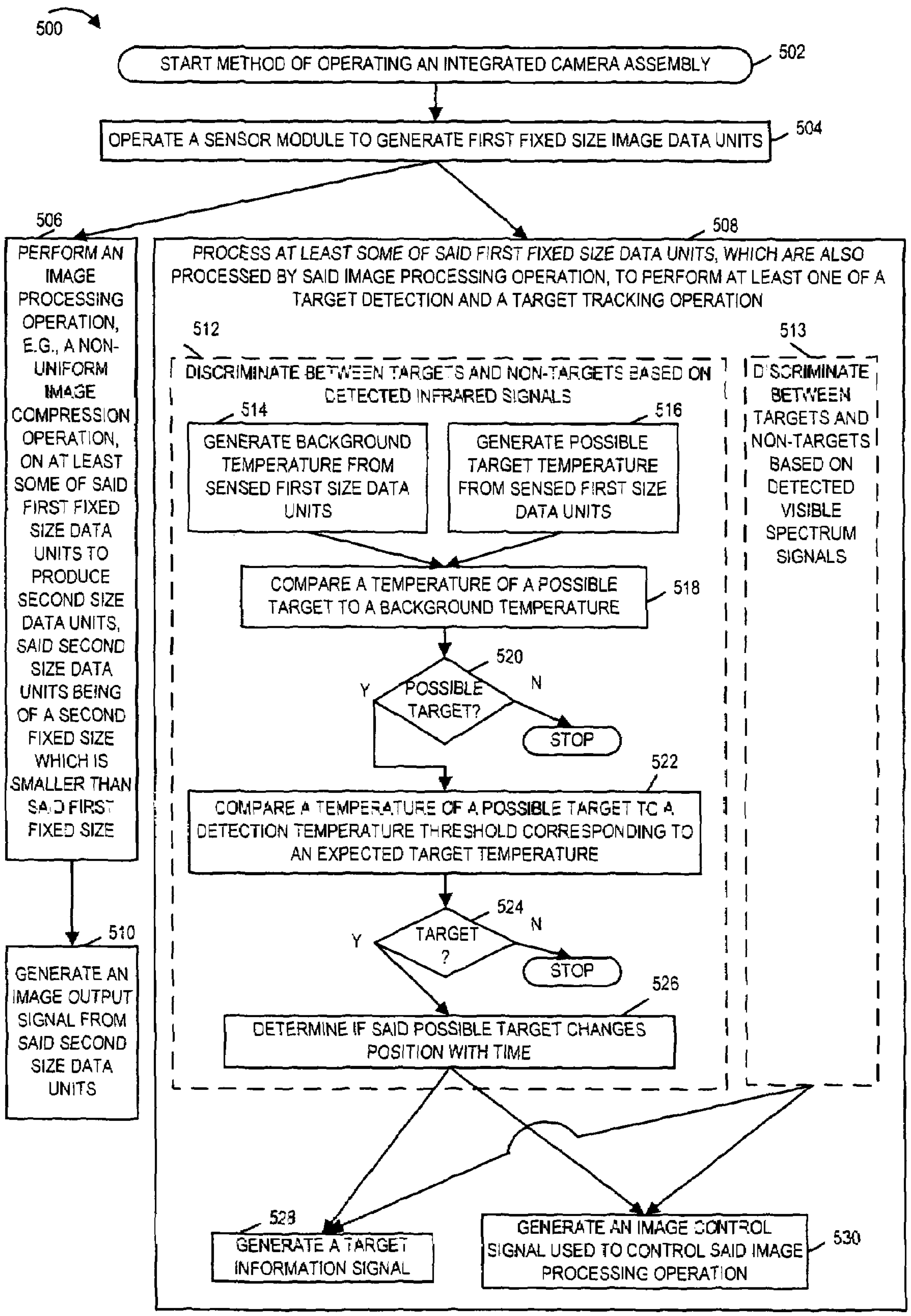
FIG. 5 is a drawing of a flowchart 500 of an exemplary method of operating an integrated camera assembly in accordance with the present invention.

FIG. 5 is a drawing of a flowchart 500 of an exemplary method of operating an integrated camera assembly in accordance with the present invention. For example, the exemplary method of flowchart 500 may be performed within a single camera housing, the single camera housing being located in a system including one or a plurality of cameras coupled to a common control center. Alternatively, the integrated camera assembly can be a single standalone smart camera assembly including built in detection and tracking capabilities. The exemplary camera may be one of the integrated smart camera (202, 204, 206, 206, 208, 210, 212) of system 200 of FIG. 2.

The exemplary method starts in step 502, where the integrated camera assembly is powered on and initialized. Operation proceeds from start step 502 to step 504. In step 504, the integrated camera assembly operates a sensor module to generate first fixed size data units. In some embodiments, the sensor module senses visible light. In some embodiments, the sensor module senses infrared electromagnetic radiation. In some embodiments, the sensor module senses both visible light and infrared electromagnetic radiation. Operation proceeds from step 504 to step 506 and step 508. In step 506, the camera assembly performs an image processing operation, e.g., a non-uniform image compression operation, on at least some of said first fixed size data units to produce second size data units, said second size data units being of a second fixed size which is smaller than said first fixed size. Operation proceeds from step 506 to step 510. In step 510, the camera assembly generates an image output signal from said second size data units.

Returning to step 508, in step 508, the camera assembly processes at least some of said first fixed size data units, which were also processed by said image processing operation (step 506), to perform at least one of a target detection and a target tracking operation. Step 508 includes one or both of sub-step 512 and sub-step 513, sub-step 528 and sub-step 530. For example, if the exemplary camera assembly is a visible spectrum camera assembly, sub-steps 513, 528 and 530 are included; if the camera assembly is an infrared camera assembly sub-steps 512, 528 and 530 are included; if the camera is a hybrid visible/IR camera sub-steps 512, 513, 528 and 530 are included.

In sub-step 512, the camera assembly discriminates between targets and non-targets based on detected infrared signals. Sub-step 512 includes sub-steps 514, 516, 518, 520, 522, 524, and 526. In sub-step 514, the camera assembly generates background temperature from sensed first size data units, while in sub-step 516, the camera assembly generates possible target temperature from sensed first size data units. Operation proceeds from sub-steps 514 and 516 to sub-step 518. In sub-step 518, the camera assembly compares a temperature of a possible target to a background temperature and then in sub-step 520 operation proceeds depending upon the result on the comparison. If the comparison of step 518, indicted that the possible target should still be considered a possible target operation proceeds from sub-step 520 to sub-step 522; otherwise the possible target is discarded.

In sub-step 522 the camera assembly compares a temperature of a possible target to a detection temperature threshold corresponding to an expected target temperature, and then in stub-step 524 operation proceeds depending on the result of the comparison, If the comparison of sub-step 522 determines that the potential target considered is a viable target, operation proceeds to sub-step 526; otherwise the potential target is discarded.

In sub-step 526, the camera assembly determines if the possible target has changed position with time.

Returning to sub-step 513, in sub-step 513, the camera assembly discriminates between targets and non-targets based on detected visible spectrum signals. The discrimination of sub-step 512 and/or sub-step 513 is based on first sized data units which provide more information than second size data units.

Operation proceeds from sub-step 512 and/or sub step 513 to sub-step 528 and sub-step 530. In sub-step 528, the camera assembly generates a target information signal. In some embodiments, the target information signal communicates at least one of: an indication that a target has been detected, information identifying the target, information characterizing a detected target, a camera positioning control signal, a second camera control signal used to control a second camera, and location information relating to tracking the target. In sub-step 530, the camera assembly generates an image control signal used to control said image processing operation. In some embodiments, the image processing operation is a non-uniform image compression operation, and the non-uniform image compression operation is adjusted as a function of said image control signal to enhance the visual perceptibility of a detected target.

In various embodiments elements described herein are implemented using one or more modules to perform the steps corresponding to one or more methods of the present invention. Thus, in some embodiments various features of the present invention are implemented using modules. Such modules may be implemented using software, hardware or a combination of software and hardware. Many of the above described methods or method steps can be implemented using machine executable instructions, such as software, included in a machine readable medium such as a memory device, e.g., RAM, floppy disk, etc. to control a machine, e.g., general purpose computer with or without additional hardware, to implement all or portions of the above described methods, e.g., in one or more nodes. Accordingly, among other things, the present invention is directed to a machine-readable medium including machine executable instructions for causing a machine, e.g., processor and associated hardware which may be part of a test device, to perform one or more of the steps of the above-described method(s).

Numerous additional variations on the methods and apparatus of the present invention described above will be apparent to those skilled in the art in view of the above description of the invention. Such variations are to be considered within the scope of the invention.

What is claimed is:

1. A method of operating an integrated camera assembly including a camera housing, comprising:

operating a sensor module mounted in said camera housing to generate first fixed size data units, each first fixed size data unit being of a first pixel value size;

performing, within said camera housing, an image processing operation on at least some of said first fixed size data units to produce second size data units, each individual one of the first fixed size data units and second size data units communicating a single pixel value, each second fixed size data unit being of a second pixel value size, said second fixed size data units being of a second fixed size which is smaller than said first fixed size;

generating, within said camera housing, an image output signal from said second fixed size data units;

processing, within said camera housing, at least some of said first fixed size data units, which are also processed by said image processing operation, to perform at least one of a target detection and a target tracking operation; and outputting, to a device outside said camera housing, said image output signal.

2. The method of claim 1, wherein said each of said first fixed size data units includes a first number of bits and wherein each of said second fixed size data units includes a second number of bits, said second number being less than said first number.

3. The method of claim 1, wherein said processing to perform at least one of a target detection and a target tracking operation includes generating, within said camera housing, a target information signal; and wherein the target information signal communicates at least one of: an indication that a target has been detected, information identifying the target, information characterizing a detected target, a camera positioning control signal, a second cameral control signal used to control a second camera, or location information relating to tracking the target.

4. The method of claim 1, wherein said processing at least some of said first fixed size data units to perform at least one of a target detection and a target tracking operation includes:

generating, within said camera housing, a target information signal from said first fixed size data units; and generating, within said camera housing, an image control signal used to control said image processing operation performed on at least some of said first fixed size data units to produce second size data units, said image processing operation including a visual gain adjustment operation performed by a visual processing module within said camera housing.

5. The method of claim 4, wherein said visual gain adjustment operation enhances the visual perceptibility of a detected target; and wherein generating, within said camera housing, an image output signal from said second fixed size data units includes:

performing an image compression operation on the second fixed size data units generated by said image processing operation.

6. The method of claim 5, wherein said image compression operation is a non-uniform compression operation that is adjusted as a function of said image control signal to enhance the visual perceptibility of a detected target.

7. The method of claim 1, wherein each one of said first fixed size data units is a 16 bit data unit and each one of said second fixed size data units is an 8 bit data unit.

8. The method of claim 4, wherein said sensor module senses infrared electromagnetic radiation.

9. The method of claim 8, further comprising:

discriminating between targets and non-target objects based on detected infrared signals.

10. The method of claim 9, wherein said discrimination is based on said first sized data units which provide more information than said second fixed size data units.

11. The method of claim 9, wherein said discriminating includes comparing a temperature of a possible target to a background temperature.

12. The method of claim 11, further comprising:

generating said background temperature from sensed first size data units.

13. The method of claim 4, wherein said step of performing, within said camera housing, an image processing operation on at least some of said first fixed size data units to produce second size data units is performed by a first module within said camera housing; and wherein said step of processing at least some of said first fixed size data units, which are also processed by said image processing operation, to perform at least one of a target detection and a target tracking operation is performed by a second module within said camera housing, said first and second modules be coupled to each other and to the camera sensor module both said first and second modules receiving said first size data units from said camera sensor module.

14. The method of claim 9, wherein said discriminating includes comparing a temperature of a possible target to a detection temperature threshold corresponding to an expected target temperature.

15. The method of claim 1, wherein said processing to perform at least one of a target detection and a target tracking operation includes generating a target information signal; and wherein said method is performed within a single camera housing, said single camera housing being located in a system including a plurality of cameras coupled to a common control center.

16. An integrated camera assembly, comprising:

a camera housing;

a sensor module configured to generate first fixed size image data units, each first fixed size data unit including a total number of bits which equals the number of bits in a pixel value generated by said sensor module;

an image processing module located inside said camera housing for performing an image processing operation on at least some of said first fixed size data units to produce second size data units, each individual one of the first fixed size data units and second data units communicating a single pixel value, said second size data units being of a second fixed size which is smaller than said first fixed size, each second fixed size data unit communicating less bits than a first fixed size data unit;

a video compression module, located inside said camera housing, coupled to said image processing module configured to generate a compressed image output signal from said second fixed size data units; and a secondary processing module, located inside said camera housing, configured to process at least some of said first fixed size data units, which are also processed by said image processing module, said secondary processing module at least one of a target detection and a target tracking operation.

17. The integrated camera assembly of claim 16, wherein said secondary processing module includes a detection and tracking module configured to generate a target information signal.

18. The integrated camera assembly of claim 17, wherein the target information signal communicates at least one of: an indication that a target has been detected, information identifying the target, information characterizing a detected target, a camera positioning control signal, a second cameral control signal used to control a second camera, or location information relating to tracking the target.

19. The integrated camera assembly of claim 17, wherein said secondary processing module includes:

an image processing control module for generating an image processing control signal used to control said image processing performed by said image processing module.

20. The integrated camera assembly of claim 19, further comprising:

a non-uniform image compression module, located inside said camera housing and being coupled to said image processing module, said non-uniform image compression module being configured to perform a video compression operation on said second size data units generated by said image processing module.

21. The integrated camera assembly of claim 20, wherein said image control signal controls said non-uniform image compression module to enhance the visual perceptibility of a detected target.

22. The integrated camera assembly of claim 19, wherein said sensor module includes a visible light sensor.

23. The integrated camera assembly of claim 19, wherein said sensor module includes an infrared electromagnetic radiation sensor.

24. The integrated camera assembly of claim 23, wherein said secondary processing module includes a target discrimination module for discriminating between targets and non-target objects based on detected infrared signals.

25. The integrated camera assembly of claim 24, wherein said discrimination is based on first sized data units which provide more information than said second size data units.

26. The integrated camera assembly of claim 24, wherein said target discrimination module includes a comparator for comparing a temperature of a possible target to a background temperature.

27. The integrated camera assembly of claim 26, wherein said target discrimination module further comprises:

a background temperature determination module for generating said background temperature from sensed first size data units.

28. The integrated camera assembly of claim 26, wherein said discrimination module further includes:

a position determination module for determining if said possible target changes position with time.

29. The integrated camera assembly of claim 24, wherein said discriminating module includes a comparator for comparing a temperature of a possible target to a detection temperature threshold corresponding to an expected target temperature.

30. The integrated camera assembly of claim 20, further comprising:

an Internet Protocol Interface, located inside said camera housing, configured to output compressed video generated by said video compression module and detected target information generated by secondary processing module.

* * * * *